(12) United States Patent
Kim

(10) Patent No.: US 6,552,974 B1
(45) Date of Patent: Apr. 22, 2003

(54) COMPATIBLE OPTICAL PICKUP

(75) Inventor: Eun-goo Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/537,099

(22) Filed: Mar. 29, 2000

(30) Foreign Application Priority Data

Mar. 31, 1999 (KR) ............................................ 99-11301

(51) Int. Cl.$^7$ ................................................. G11B 7/00
(52) U.S. Cl. .................................................. 369/44.37
(58) Field of Search ................................ 369/121, 122, 369/44.41, 112.17, 120, 112.05, 112.07, 112.24, 53.26, 53.2, 94, 116, 112.21, 44.37, 44.38

(56) References Cited

U.S. PATENT DOCUMENTS

| | | | | |
|---|---|---|---|---|
| 4,733,065 A | * | 3/1988 | Hoshi et al. | 250/201.5 |
| 5,703,856 A | * | 12/1997 | Hayashi et al. | 369/53.2 |
| 5,910,938 A | * | 6/1999 | Kimura | 369/112.11 |
| 5,933,401 A | * | 8/1999 | Lee et al. | 369/112.21 |
| 5,974,020 A | | 10/1999 | Ju et al. | 369/112.17 |
| 6,031,667 A | * | 2/2000 | Sugiura et al. | 359/618 |

FOREIGN PATENT DOCUMENTS

| | | |
|---|---|---|
| EP | 0 776 003 | 5/1997 |
| EP | 0 855 701 | 7/1998 |
| JP | 4-117637 | 4/1992 |
| JP | 7-272303 | 10/1996 |
| JP | 10-79138 | 3/1998 |
| JP | 10-269607 | 10/1998 |
| JP | 10-269608 | 10/1998 |
| JP | 10-302289 | 11/1998 |

* cited by examiner

Primary Examiner—Thang V. Tran
Assistant Examiner—Kimlien Le
(74) Attorney, Agent, or Firm—Burns Doane Swecker & Mathis, LLP

(57) ABSTRACT

An optical pickup compatible between a digital video disc read only memory (DVD-ROM) and a compact disc rewritable (CD-RW), which is a member of the CD family media. The compatible optical pickup includes: a first light source for emitting a first light having a predetermined wavelength; a second light source for emitting a second light having a long wavelength relative to the first light; an optical path changing unit for changing the traveling path of an incident light; an objective lens for condensing the first and second lights onto optical discs having different thicknesses, respectively; and a main photodetector for detecting an information signal and error signals from the first and second lights which have been reflected by the optical discs and passed through the optical path changing unit. The optical path changing unit includes a planar first beam splitter disposed on the optical path between the first light source and the objective lens, for changing the traveling path of the first light from the first light source, and a planar second beam splitter disposed on the optical path between the first beam splitter and the objective lens, for changing the optical paths of the first and second lights. The main photodetector comprises a first photodetector having four divided regions, a second photodetector having two divided regions, and a third photodetector having two divided regions, the second and third photodetectors being disposed at both sides of the first photodetector.

10 Claims, 4 Drawing Sheets

COMPATIBLE OPTICAL PICKUP

BACKGROUND OF THE INVENTION

1. Field of the Invention

The present invention relates to optical pickups capable of adopting disc type recording media having different formats, and more particularly, to a compatible optical pickup for a compact disc rewritable (CD-RW), a member of the CD family media, and a digital video disc read only memory (DVD-ROM).

2. Description of the Related Art

Recently, the need for an optical pickup capable of recording and/or reproducing information on and/or from a DVD at a high density be compatible with CD family media such as CD, recordable CD (CD-R), CD-RW, CD interactive (CD-I) and CD plus graphics (CD+G) has arisen.

The standard thickness of existing CD family media is 1.2 mm, whereas the thickness of DVDs has been standardized to 0.6 mm in consideration of the allowable error in the tilt angle of a disc and the numerical aperture (NA) of an objective lens. Accordingly, when recording or reproducing information on or from a CD using an optical pickup for DVDs, spherical aberrations occur due to a difference in the thicknesses therebetween. Such spherical aberration cannot provide a light intensity sufficient for recording an information (radio frequency) signal or may deteriorate the signal reproduced from the CD. Also, DVDs and CD family media utilize different wavelengths of light for reproduction: CDs use light having a wavelength of about 780 nm as a light source for reproduction, whereas DVDs use light having a wavelength of about 650 nm as a light source therefor. Thus, for the compatibility with CDs, an optical pickup adopting a light source capable of emitting different wavelengths of light, and a structure in which optical spots can be formed at different focal positions is required.

Referring to FIG. 1, a conventional compatible optical pickup comprises a first light source 21 for emitting light having a wavelength of about 650 nm and a second light source 31 for emitting light having a wavelength of about 780 nm. The first light source 21 is appropriate for a DVD 10a, which is a relatively thin disc, and the second light source 31 is appropriate for a CD 10b, which is a relatively thick disc. The first and second light sources 21 and 31 are selectively driven according to the type of adopted optical disc, a DVD or a CD.

Light emitted from the first light source 21 is condensed by a first collimator lens 23, parallel incident onto a first polarization beam splitter (PBS) 25, and then reflected by the first PBS 25 toward the DVD 10a. After reflected by the DVD 10a, the reflected light is transmitted through the first PBS 25 and is then received by a first photodetector 27. Here, an interference filter 41 for changing the paths of light emitted from the first and second light sources 21 and 31, a ¼-wavelength plate 43 for delaying the phase of light incident thereto to change the polarization characteristic, a variable diaphragm 45, and an objective lens 47 for condensing light incident thereto are situated on an optical path between the first PBS 25 and the disc 10.

Light emitted from the second light source 31 is condensed by a second collimator lens 33, parallel incident onto a second PBS 35, transmitted through a condenser lens 37, and then incident onto the interference filter 41. The light is reflected by the interference filter 41 and passes through the ¼-wavelength plate 43, the variable diaphragm 45 and the objective lens 47 in sequence to form an optical spot on the CD 10b.

Light reflected by the CD 10b is incident onto the interference filter 41 through the objective lens 47, the variable diaphragm 45 and the ¼-wavelength plate 43, and then reflected by the interference filter 41 heading toward the second PBS 35. The light is reflected by the second PBS 35 and received by a second photodetector 39.

The interference filter 41, an optical element for transmitting or reflecting incident light depending on the wavelength of the incident light, transmits the light emitted from the first light source 21 and reflects the light emitted from the second light source 31.

Referring to FIG. 2, the variable diaphragm 45 comprises a first region 45a, which is variable in size, and a second region 45b bounding the first region 45a, and selectively transmits the light incident onto a region of the objective lens 27 having a NA of 0.6 or less. The first region 45a, which corresponds to a region of the objective lens 47 having a NA of 0.45 or less, completely transmits the light emitted from the first and second light sources 21 and 31. The second region 45b, which corresponds to a region of the objective lens having a NA of 0.45 to 0.6, completely transmits light having a wavelength of 650 nm and completely reflects light having a wavelength of 780 nm.

In the conventional compatible optical pickup, the variable diaphragm completely reflects the light for recording on a CD-R, which is emitted from the second light source and incident onto a region having a NA of 0.45 or more, and thus it cannot be applied to an optical pickup for CD-RWs, which requires a NA of 0.5 or more and high optical efficiency for recording. Also, the need for the variable diaphragm having first and second regions, which is manufactured through sophisticated and expensive processes makes assembling of such optical pickup complicates and increases the manufacturing cost.

SUMMARY OF THE INVENTION

It is an object of the present invention is to provide a compatible optical pickup capable of reproducing information from a digital video disc read only memory (DVD-ROM), in addition to writing or reproducing information on or from a compact disc rewritables (CD-RWs), which ensures output of a wavelength of 780 nm with a high optical power, and a high numerical aperture (NA) of approximately 0.5 or more.

To achieve the above object, the present invention provides a compatible optical pickup comprising: a first light source for emitting a first light having a predetermined wavelength; a second light source for emitting a second light having a long wavelength relative to the first light; an optical path changing means for changing the traveling path of an incident light; an objective lens for condensing the first and second lights onto optical discs having different thicknesses, respectively; and a main photodetector for detecting an information signal and error signals from the first and second lights which have been reflected by the optical discs and passed through the optical path changing means, wherein the optical path changing means includes a planar first beam splitter disposed on the optical path between the first light source and the objective lens, for changing the traveling path of the first light from the first light source, and a planar second beam splitter disposed on the optical path between the first beam splitter and the objective lens, for changing the optical paths of the first and second lights, and the main photodetector comprises a first photodetector having four divided regions, a second photodetector having two divided regions, and a third photodetector having two divided regions, the second and third photodetectors being disposed at both sides of the first photodetector.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1:
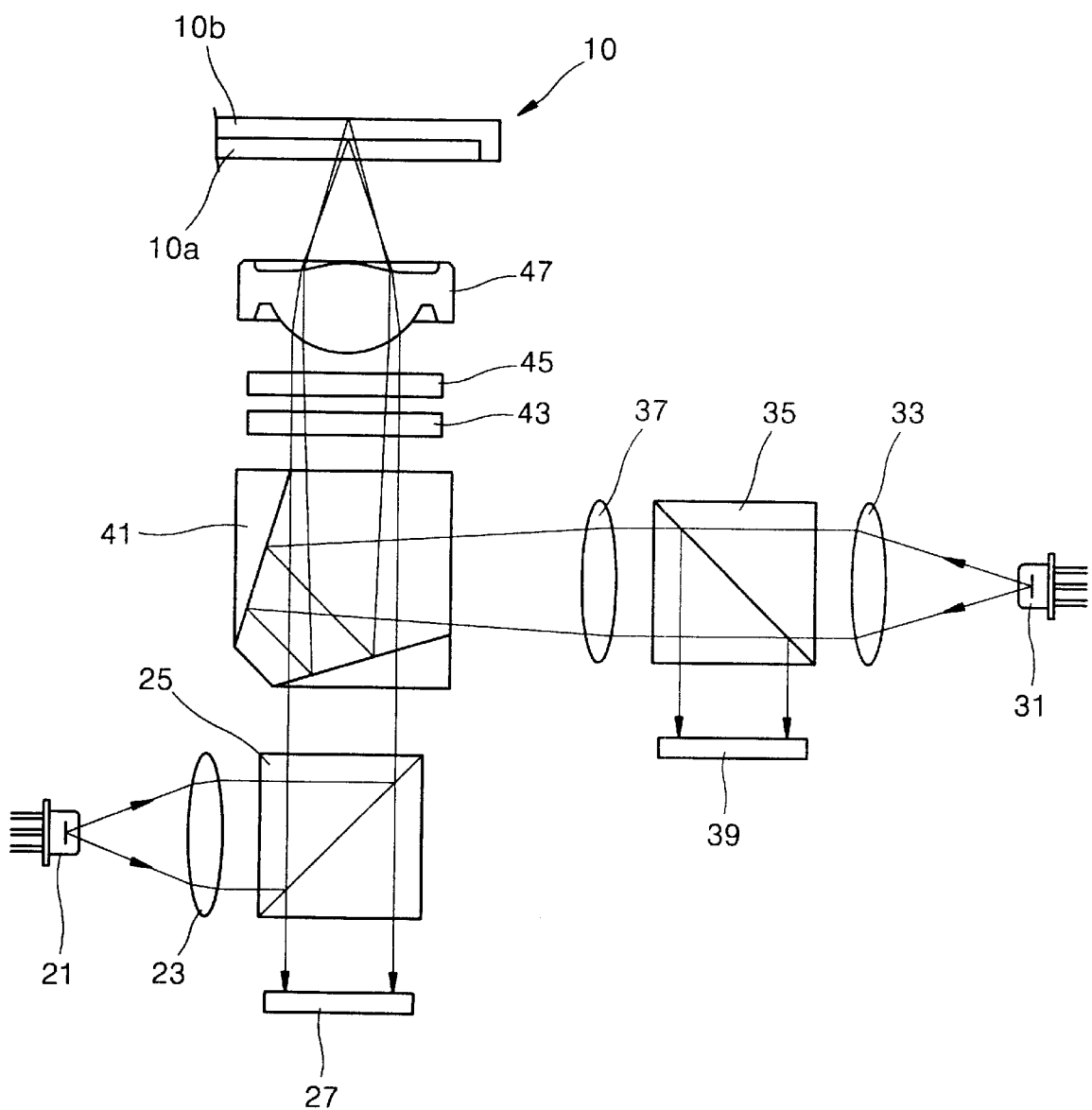
FIG. 1 is a schematic view showing the optical arrangement of a conventional compatible optical pickup.
Figure 2:
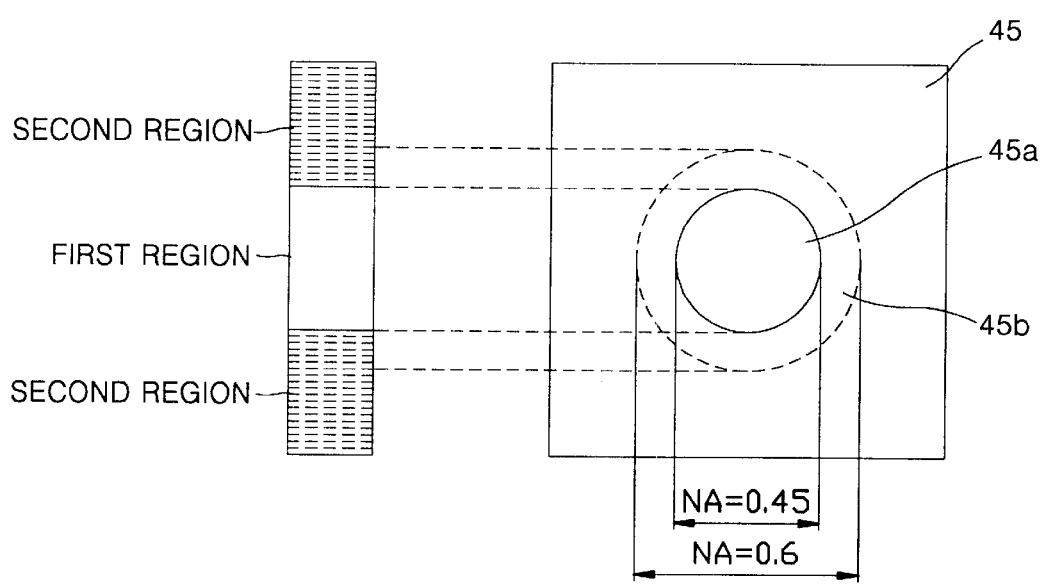
FIG. 2 illustrates the variable diaphragm of FIG. 1.
Figure 3:
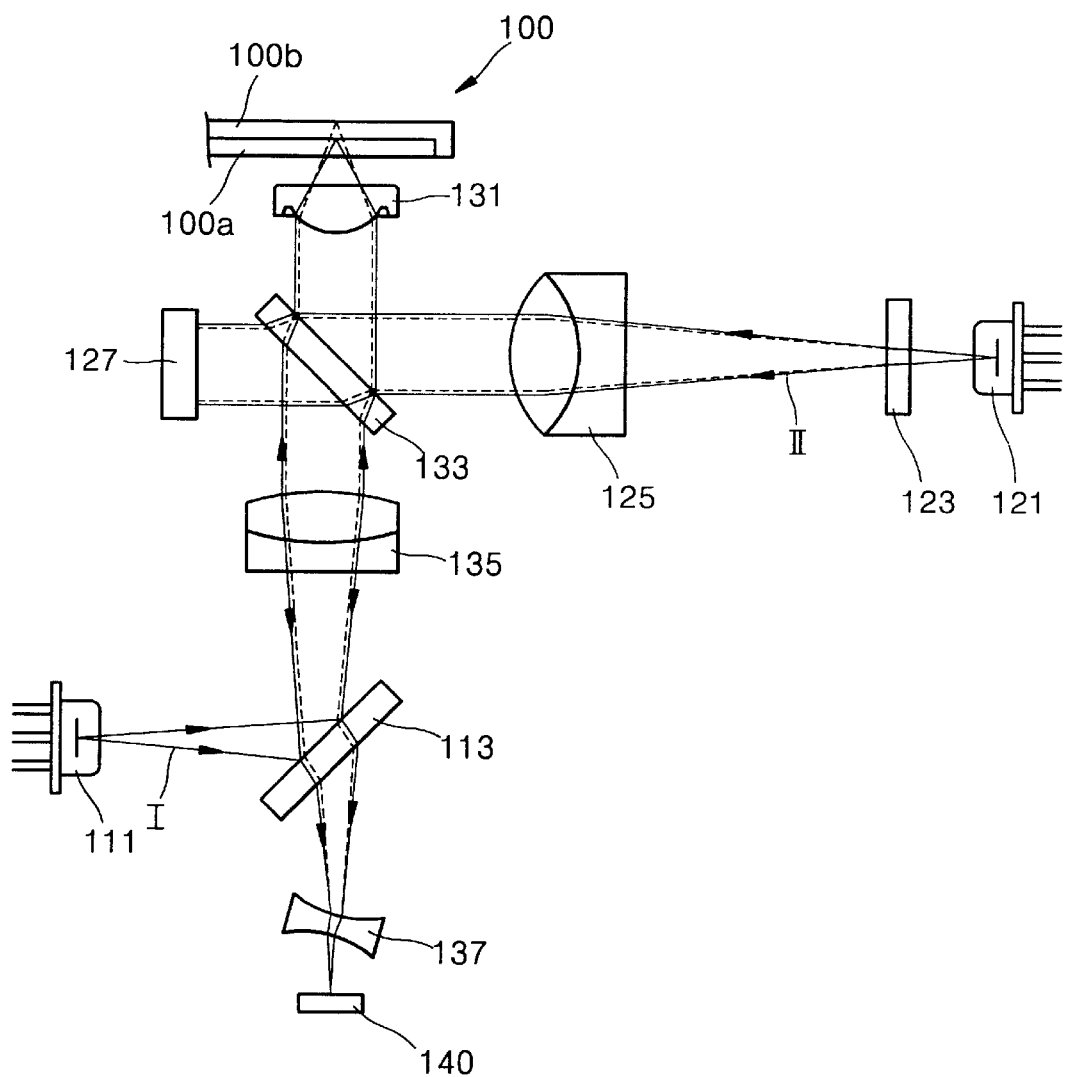
FIG. 3 is a schematic view showing the optical arrangement of a compatible optical pickup according to a preferred embodiment of the present invention.

Referring to FIG. 3, a preferred embodiment of a compatible optical pickup according to the present invention includes first and second light sources 111 and 121 for emitting light having different wavelengths, an optical path changing means (113, 133) for changing the path of an incident light, an objective lens 131 for condensing the incident light so as to form an optical spot on an optical disc 100, and a main photodetector 140 for detecting an information (radio frequency) signal and an error signal from the incident light which is reflected by the optical disc 100 and passes through the optical path changing means.

The first light source 111 emits a first light I having a wavelength of about 650 nm. The emitted first light I is used to reproduce information from a relatively thin disc 100a such as a digital video disc read only memory (DVD-ROM). Also, the second light source 121 emits a second light II having a wavelength of about 780 nm, and the emitted second light II is used to record or reproduce information on or from a relatively thick optical disc 100b such as a compact disc (CD) or a CD rewritable (CD-RW). It is desirable that the second light source 121 is constructed of a semiconductor laser with high optical power to output several tens of micro watts, which is high enough to write information on CD-RWs. A grating 123 for diffracting and transmitting the incident light so as to detect a tracking error signal by a three-beam method, is disposed on the optical path between the second light source 121 and the optical path changing means. The grating 123 diffracts and transmits the light emitted from the second light source 121 to be at least $0^{th}$ and $\pm 1^{st}$-order light.

The optical path changing means includes a first beam splitter 113 for changing the traveling path of the first light I emitted from the first light source 111, and a second beam splitter 131 disposed between the first beam splitter 113 and the objective lens 131, for changing the traveling path of the light incident thereto.

The first beam splitter 113 makes the first light I incident from the first light source 111 toward the optical disc 100, and the first and second lights I and II, which have been reflected by the optical disc 100, toward the photodetector 140.

The second beam splitter 133 changes the traveling paths of the light incident thereto by partially transmitting or reflecting the first and second lights I and II incident thereto. In the case of having the optical arrangement shown in FIG. 3, the second beam splitter 133 reflects a part of the second light II emitted from the second light source 121 such that it heads toward the optical disc 100, and transmits the rest of the second light II. Also, the second beam splitter 133 transmits a part of the first light I emitted from the first light source 111 such that it heads toward the optical disc 100, and reflects the rest of the first light I. The second beam splitter 133 transmits a part of the light, which has been reflected by the optical disc 100, such that it heads toward the main photodetector 140.

In the present embodiment, the first and second beam splitters 113 and 133 are planar beam splitters arranged at an angle of 45 degrees with respect to the optical path. Preferably, the first and second beam splitters 113 and 133 have a thickness of 1.5 mm or less, so as to minimize spherical aberration occurring when the light passes through the first and second beam splitters 113 and 133. Here, by arranging the first and second beam splitters 113 and 133 to be slanted in different directions with respect to the optical path, as shown in FIG. 3, the problem of optical aberration which is caused by adopting such planar beam splitters can be eliminated. Thus, the cost can be reduced relative to the case of adopting a beam splitter having a common cubit structure.

The optical power of the light emitted from the second light source 121 is detected by a monitoring photodetector 127. The monitoring photodetector 127 receives the second light II, which is emitted from the second light source 121 and passes through the second beam splitter 133, to detect the optical power thereof. The optical power of the light detected by the monitoring photodetector 127 is controlled by an automatic power controller (not shown).

The objective lens 131 has an NA appropriate for the DVD-RAM format, for example, an NA of 0.6, and condenses the first and second lights I and II to form a light spot, respectively, on the optical discs 100a and 100b. In order to condense the first and second lights I and II onto each recording surface of the optical discs 100a and 100b having different thicknesses, an annular shielding lens may be adopted as the objective lens 131, or an additional optical control means may be further included. Such an annular shielding lens and optical control means was suggested by the instant applicant in U.S. Pat. Nos. 5,665,957; 5,822,135; 5,909,424; and 5,987,924, and these patents are incorporated by references herein.

The main photodetector 140 receives the light reflected by the optical disc 100a or 100b through the objective lens 131, the second and first beam splitters 133 and 113, and a light-receiving lens 137. The light-receiving lens 137, which is disposed between the first beam splitter 113 and the photodetector 140, causes astigmatism which enables a focusing error detection by an astigmatism method. The main photodetector 140 detects error and RF signals from the received light. The optical configuration of the main photodetector 140 is shown in FIG. 4.

Figure 4:
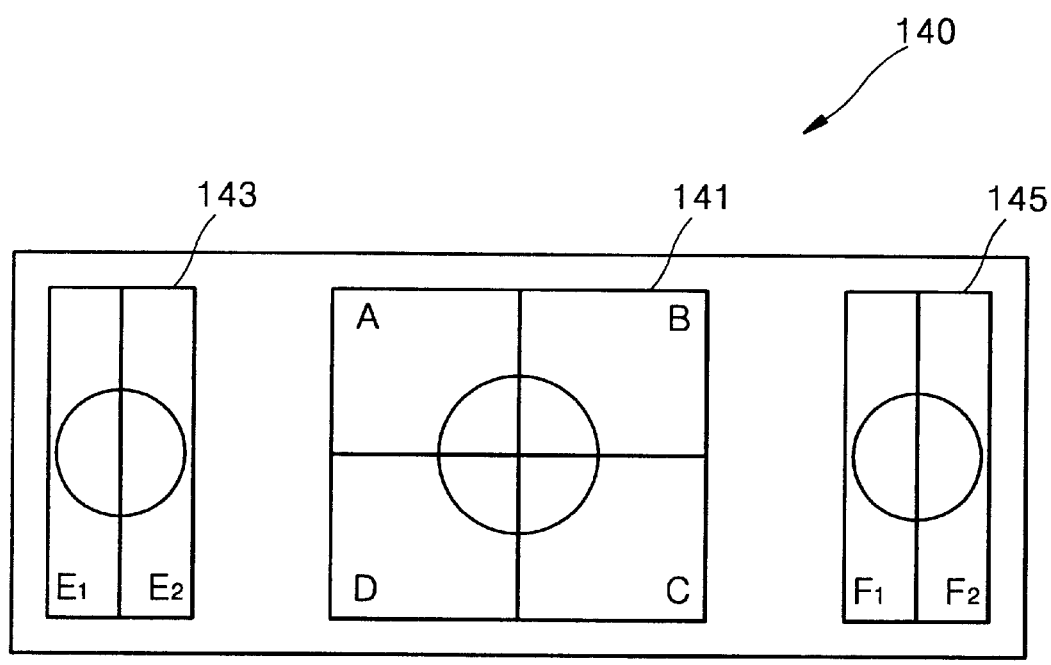
FIG. 4 is a plan view showing the configuration of the main photodetector of FIG. 3.

Referring to FIG. 4, the main photodetector 140 includes a first photodetector 141, and second and third photodetectors 143 and 145 which are disposed at both sides of the first photodetector 141. The first photodetector 141 consists of four divided regions A, B, C and D, the second photodetector 143 consists of two divided regions E1 and E2, and the third photodetector 145 consists of two divided regions F1 and F2. This configuration of the main photodetector 140 is for detecting error signals by a differential push-pull (DPP) method.

For reproduction from the relatively thin optical disc 100a, such as a DVD-ROM, the main photodetector 140 detects a tracking error signal by a differential phase detection (DPD) method and a focusing error signal by an astigmatism method. For writing information on the relatively thick optical disc 100b, such as a CD-RW, the main photodetector 140 detects a tracking error signal by a DPP method and a focusing error signal by an astigmatism method. For reproducing information from the optical disc 100b, a tracking error signal is detected by a three-beam method, and a focusing error signal is detected by an astigmatism method. The reason for adopting the DPP method during the writing operation on the relatively thick optical disc 100b, i.e., a CD-RW, is to prevent possible tracking offset due to differences in optical distribution and reflectivity. Here, the difference in optical distribution occurs by tilting of optical discs and shifting of the objective lens 131, and the difference in reflectivity occurs when one of $\pm 0^{th}$ order diffracted beams from the grating 123 is focused onto a data recorded area while the other thereof is focused onto a non-data recorded area.

The compatible optical pickup according to the present invention may further comprise first and second collimator lenses 125 and 135. The first and second collimator lenses 125 and 135 cause the incident light to converge to set the optical focal lengths between the first and second light sources 111 and 121, and the optical disc 100. The first collimator lens 125 is disposed on the optical path between the second light source 121 and the second beam splitter 133, and pre-condenses the emanated light from the second light source 121. The first collimator lens 125 makes the optical focal length short such that light emitted from the second light source 121 is suitable for a CD-RW that requires a high optical efficiency. The second collimator lens 135 is disposed on the optical path between the first and second beam splitters 113 and 133, and collimates the light heading toward the optical disc 100.

The compatible optical pickup according to the present invention with the above configuration has advantages in that it can be adopted in recording information on a CD-RW that requires a high NA of 0.5 or more and a high optical efficiency. Also, the use of planar first and second beam splitters can reduce the manufacturing cost relative to the case of using a cubic beam splitter.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A compatible optical pickup comprising:
   a first light source for emitting a first light having a predetermined wavelength;
   a second light source for emitting a second light having a long wavelength relative to the first light;
   an optical path changing means for changing the traveling path of an incident light;
   an objective lens for condensing the first and second lights onto optical discs having different thicknesses, respectively; and
   a main photodetector for detecting an information signal and error signals from the first and second lights which have been reflected by the optical discs and passed through the optical path changing means,
   wherein the optical path changing means includes a planar first beam splitter disposed on the optical path between the first light source and the objective lens, for changing the traveling path of the first light from the first light source, and a planar second beam splitter disposed on the optical path between the first beam splitter and the objective lens, for changing the optical paths of the first and second lights, and
   the main photodetector comprises a first photodetector having four divided regions, a second photodetector having two divided regions, and a third photodetector having two divided regions, the second and third photodetectors being disposed at both sides of the first photodetector.

2. The compatible optical pickup of claim 1, wherein each of the first and second beam splitters has a thickness of approximately 1.5 mm or less such that spherical aberration occurring when the light passes through the first and second beam splitters is reduced.

3. The compatible optical pickup of claim 1, further comprising a grating on the optical path between the second light source and the second beam splitter, the grating for diffracting and transmitting the light from the second light source to be at least the 0-th and ±1-st order light.

4. The compatible optical pickup of claim 1, further comprising:
   a first collimator lens disposed on the optical path between the second light source and the second beam splitter, for pre-condensing and transmitting the incident light; and
   a second collimator lens disposed on the optical path between the first and second beam splitters, for condensing and transmitting the incident light.

5. The compatible optical pickup of claim 1, further comprising a monitoring photodetector for receiving the light emitted from the second light source through the second beam splitter to detect the optical power of the light from the second light source.

6. An optical pickup compatible between a compact disc rewritable (CD-RW) and a digital video disc read only memory (DVD-ROM), comprising:
   a first light source for emitting a first light having a wavelength of approximately 650 nm;
   a second light source for emitting a second light having a wavelength of approximately 780 nm;
   an objective lens for condensing the first light onto optical digital video discs including a DVD-ROM having a thickness of about 0.6 mm, and the second light onto optical compact disc (CD) family media including a CD-RW having a thickness of about 1.2 mm;
   a first planar beam splitter disposed on the optical path between the first light source and the objective lens, for changing the traveling path of the first light from the first light source;
   a second planar beam splitter disposed on the optical path between the first beam splitter and the objective lens, for changing the traveling paths of the first and second lights; and
   a main photodetector for detecting an information signal and error signals from the first and second lights which have been reflected by the optical discs and passed through the second and first beam splitters, the main photodetector including a first photodetector with four divided regions A, B, C and D, a second photodetector with two divided regions E1 and E2, and a third photodetector with two divided regions F1 and F2, the second and third photodetectors being disposed at both sides of the first photodetector.

7. The compatible optical pickup of claim 6, wherein each of the first and second beam splitters has a thickness of approximately 1.5 mm or less such that spherical aberration occurring when the light passes through the first and second beam splitters is reduced.

8. The compatible optical pickup of claim 6, further comprising a grating on the optical path between the second light source and the second beam splitter, the grating for diffracting and transmitting the light from the second light source to be at least the 0-th and ±1-st order light.

9. The compatible optical pickup of claim 6, further comprising:

a first collimator lens disposed on the optical path between the second light source and the second beam splitter, for pre-condensing and transmitting the incident light; and a second collimator lens disposed on the optical path between the first and second beam splitters, for condensing and transmitting the incident light.

10. The compatible optical pickup of claim 6, further comprising a monitoring photodetector for receiving the light emitted from the second light source through the second beam splitter to detect the optical power of the light from the second light source.

* * * * *